(12) United States Patent
Besaw et al.

(10) Patent No.: US 12,453,644 B2
(45) Date of Patent: *Oct. 28, 2025

(54) EXPANSION DRIVER

(71) Applicant: NuVasive, Inc., San Diego, CA (US)

(72) Inventors: Christopher Besaw, San Diego, CA (US); Thomas Sweeney, III, San Diego, CA (US); Christopher Stein, San Diego, CA (US)

(73) Assignee: NuVasive, Inc., San Diego, CA (US)

( * ) Notice: Subject to any disclaimer, the term of this patent is extended or adjusted under 35 U.S.C. 154(b) by 86 days.

This patent is subject to a terminal disclaimer.

(21) Appl. No.: 18/439,159

(22) Filed: Feb. 12, 2024

(65) Prior Publication Data

US 2024/0180718 A1 Jun. 6, 2024

Related U.S. Application Data

(63) Continuation of application No. 18/006,411, filed as application No. PCT/US2022/022807 on Mar. 31, 2022.

(60) Provisional application No. 63/170,345, filed on Apr. 2, 2021.

(51) Int. Cl.
*A61F 2/46* (2006.01)
*A61F 2/44* (2006.01)
*A61F 2/30* (2006.01)

(52) U.S. Cl.
CPC .......... *A61F 2/4611* (2013.01); *A61F 2/4455* (2013.01); *A61F 2002/30579* (2013.01)

(58) Field of Classification Search
CPC ...... A61F 2/4611; A61F 2/442; A61F 2/4455; A61F 2002/30523; A61F 2002/30579; A61F 2002/4627; F16H 1/222
USPC ................ 623/17.11–17.16; 606/99–100
See application file for complete search history.

(56) References Cited

U.S. PATENT DOCUMENTS

| | | | | |
|---|---|---|---|---|
| 5,647,254 | A * | 7/1997 | Cook, Jr. .............. | B25B 23/145 81/475 |
| 6,126,665 | A * | 10/2000 | Yoon .................... | A61B 17/062 606/144 |
| 11,298,243 | B2 * | 4/2022 | Himmelberger ...... | A61F 2/4611 |
| 11,554,025 | B1 * | 1/2023 | Sweeney, III ......... | A61F 2/4611 |
| 2006/0155297 | A1 * | 7/2006 | Ainsworth ............ | A61F 2/4425 606/99 |
| 2010/0016971 | A1 * | 1/2010 | Berry ....................... | A61F 2/44 623/17.15 |

(Continued)

*Primary Examiner* — Jessica Weiss

(57) ABSTRACT

This disclosure includes an expansion driver for adjusting expandable implants, the expansion driver including an input shaft operably connected to at least one bevel gear, the at least one bevel gear configured to engage each of a first gear and a second gear; the first gear connected to a first output shaft, the first output shaft terminating in a first driver configured to communicate with a first actuator of an expandable implant; the second gear connected to a second output shaft, the second output shaft annularly disposed around at least a portion of the first output shaft; and at least one pinion configured to transfer a torque from the second output shaft to a second driver extending parallel to the first driver and configured to communicate with a second actuator of the expandable implant. Upon a rotation of the input shaft, a torque is applied to at least one of the first driver and the second driver.

17 Claims, 8 Drawing Sheets

(56) References Cited

U.S. PATENT DOCUMENTS

| | | | |
|---|---|---|---|
| 2010/0160984 A1* | 6/2010 | Berry | A61F 2/4611 606/86 A |
| 2015/0066145 A1* | 3/2015 | Rogers | A61F 2/4611 623/17.15 |
| 2015/0101432 A1* | 4/2015 | Gao | B25B 17/02 74/405 |
| 2016/0167205 A1* | 6/2016 | Wang | B25B 15/04 81/58.3 |
| 2018/0125677 A1* | 5/2018 | Burrows-Ownbey | A61F 2/447 |
| 2019/0038283 A1* | 2/2019 | Shelton, IV | A61B 34/30 |
| 2021/0045891 A1* | 2/2021 | Rogers | A61F 2/4455 |
| 2021/0346174 A1* | 11/2021 | Flint | A61F 2/4611 |

\* cited by examiner

EXPANSION DRIVER

CROSS REFERENCE TO RELATED APPLICATION

The present patent application is a continuation application of U.S. patent application Ser. No. 18/006,411 filed on Jan. 23, 2023, which is a 371 of international PCT/US2022/022807 filed Mar. 31, 2022, which claims priority to U.S. Provisional Patent Application No. 63/170,345, filed Apr. 2, 2021, which is incorporated in its entirety herein.

BACKGROUND OF THE INVENTION

Field of the Invention

The present disclosure relates generally to medical devices, and more particularly to an instrument for use with expandable implants.

Description of the Related Art

Back problems are one of the most common and debilitating medical occurrences. In the United States alone, over 500,000 spine lumbar and cervical fusion procedures are performed each year. One of the causes of back pain and disability results from the rupture or degeneration of one or more intervertebral discs in the spine.

Surgical procedures are commonly performed to correct problems with displaced, damaged, or degenerated intervertebral discs due to trauma, disease, or aging. Generally, spinal fusion procedures involve removing some or all of the diseased or damaged disc, and inserting one or more intervertebral implants into the resulting disc space. Anterior lumbar interbody fusion (ALIF), lateral lumbar interbody fusion (XLIF), and transforaminal lumbar interbody fusion (TLIF) are techniques that spine surgeons use to access the portions of the spine to be repaired or replaced.

Replacement of injured or deteriorated spinal bone with artificial implants requires understanding and consideration of the mechanisms of the inherent stresses on the spine, as well as the biological properties of the body in response to the devices. Further, the size, configuration, and placement of an artificial implant requires precision positioning and handling by a skilled surgeon.

SUMMARY OF THE INVENTION

This disclosure includes instruments for expandable implants and methods of using the same.

In some embodiments, the instrument includes: a first driver having a first gear disposed at a first end thereof; a second driver having a second gear disposed at a first end of the second driver; and a differential operably connected to the first driver and the second driver, the differential engaging each of the first gear and the second gear. The differential is configured to transfer a torque to at least one of the first driver and the second driver.

In some embodiments, a differential for an expansion driver may include: at least one bevel gear, a first gear connected to a first output shaft, and a second gear connected to a second output shaft, the at least one bevel gear rotatably connected to a first drive source and configured to rotate around a first axis, wherein upon a rotation of the at least one bevel gear about the axis by the drive source, a torque will be transferred from the at least one bevel gear to one or more of the first gear and the second gear.

In some embodiments, a differential for an expansion driver may include: a first gear connected to a first output shaft that is configured to rotate around a first axis, a second gear connected to a second output shaft that is configured to rotate around the first axis, and a rotating carrier rotatably connected to a first drive source and configured to rotate around the first axis, wherein upon a rotation of the rotating carrier about the axis, a torque will be transferred from the rotating carrier to one or more of the first gear and the second gear.

In some embodiments, the expansion driver includes: an input shaft operably connected to at least one bevel gear, the at least one bevel gear configured to engage each of a first gear and a second gear; the first gear connected to a first output shaft; the second gear connected to a second output shaft, the second output shaft annularly disposed around at least a portion of the first output shaft; and wherein upon a rotation of the input shaft a torque is applied to at least one of the first output shaft and the second output shaft.

In some embodiments, the expansion driver includes: an input shaft operably connected to a first bevel gear and a second bevel gear, wherein the first bevel gear and the second bevel gear are configured to engage each of a first gear and a second gear; the first gear is connected to a first output shaft, the first output shaft terminating in a first driver configured to communicate with a first actuator of an expandable implant; and the second gear is connected to a second output shaft, the second output shaft annularly disposed around at least a portion of the first output shaft. At least one pinion is configured to transfer a torque from the second output shaft to a second driver extending parallel to the first driver and configured to communicate with a second actuator of the expandable implant, wherein upon a rotation of the input shaft, a torque is applied to at least one of the first driver and the second driver.

An exemplary method of treating a spinal deformity is provided, the method including: preparing an intervertebral disc space of a patient; placing an expandable implant within the prepared intervertebral disc space of the patient; and adjusting the expandable implant using an expansion driver. The expansion driver comprises: an input shaft operably connected to at least one bevel gear, the at least one bevel gear configured to engage each of a first gear and a second gear; the first gear connected to a first output shaft, the first output shaft terminating in a first driver configured to communicate with a first actuator of an expandable implant; the second gear connected to a second output shaft, the second output shaft annularly disposed around at least a portion of the first output shaft; at least one pinion configured to transfer a torque from the second output shaft to a second driver extending parallel to the first driver and configured to communicate with a second actuator of the expandable implant, wherein upon a rotation of the input shaft a torque is applied to at least one of the first driver and the second driver.

BRIEF DESCRIPTION OF THE DRAWINGS

These and other features may be further understood by those with skill in the art upon a review of the appended drawings, wherein.

DETAILED DESCRIPTION

Figure 1:
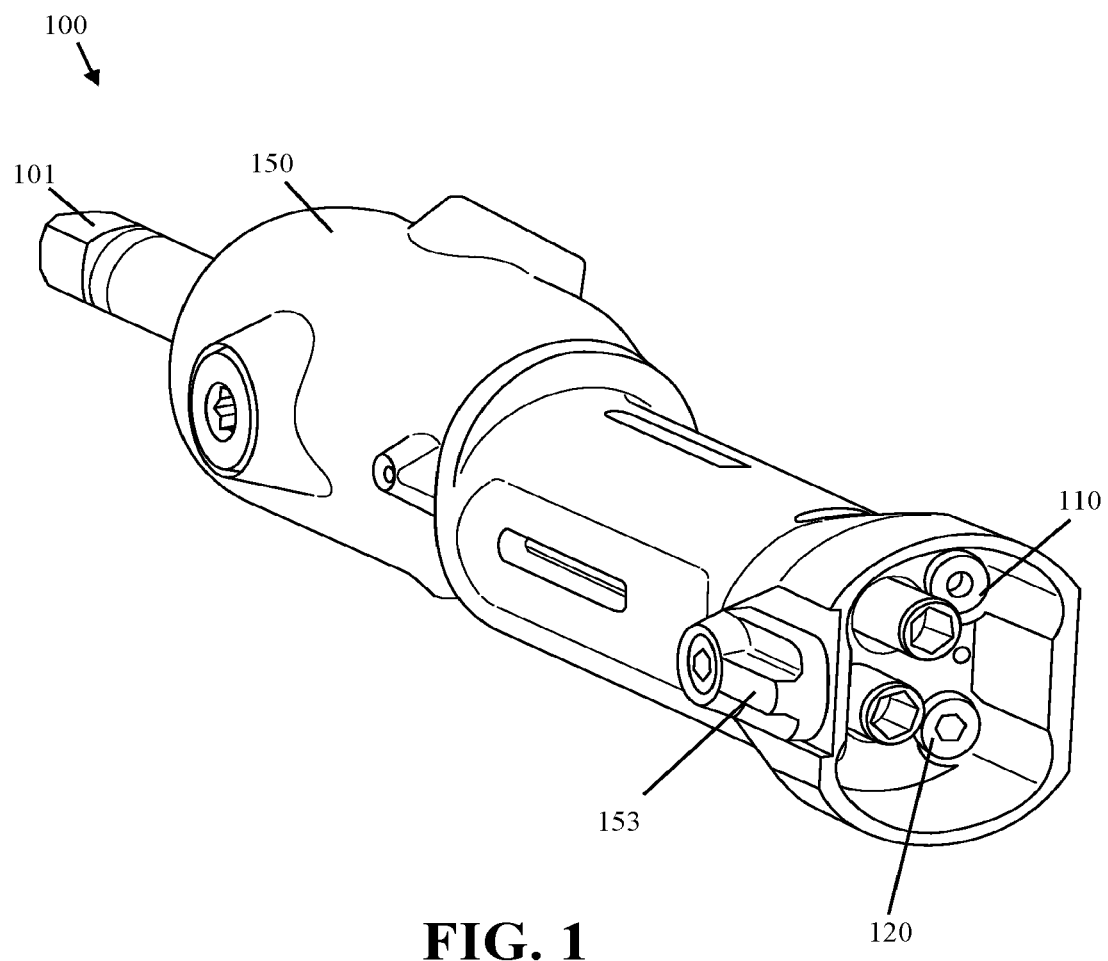
FIG. 1 shows a perspective view of an expansion driver in accordance with a first embodiment.

Illustrative embodiments are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary sill in the art having the benefit of this disclosure.

Expandable implants may include intervertebral cages, plates, distraction rods, and other adjustable medical devices. Some expandable implants may include, for example: an upper endplate, a lower endplate, and an actuator configured to change a dimension of the expandable implant. The change of dimension of the expandable implant may include a change in height, a change in width, a change in length, and a change in an angle of lordosis.

In some embodiments, an expandable implant may be designed to be inserted into the intervertebral disc space between a patient's adjacent vertebral bodies using, for example, one or more of: a lateral, posterior, and transforaminal approach. Expandable implants are generally made of any suitable biocompatible material or combination of materials. For example, the implant components may include one or more of: metal, thermoplastics such as poly ether ether ketone (PEEK), and a combination of the metal and PEEK. The expandable implant may be configured to be inserted into the disc space in a first collapsed configuration and upon being placed in a desired location within the disc space the expandable implant may be adjusted in one or more of a height, width, length, and an angle of lordosis. For example: the anterior height of the implant may be greater than the posterior height of the implant, thereby restoring a more natural lordotic curvature of a particular segment of the lumbar spine.

Adjustment of expandable implants may be accomplished for example by engaging an actuator with an expansion driver to activate the actuator and cause a movement of a first endplate relative to a second endplate to change one or more of a height, a width, a length, and an angle of lordosis of the expandable implant. The actuator may include for example at least one actuator and at least one translating wedge configured to move along the length of the at least one actuator upon a rotation of the actuator, with the wedge configured to move one or more of the first endplate and the second endplate relative to each other, to thereby change one or more of a height and an angle of lordosis of the expandable implant.

In some embodiments, the actuator of the expandable implant may include two or more actuators. In some embodiments, a first actuator is axially accessible to an expansion driver through a hollow opening in a second actuator. In other embodiments, the first actuator is disposed in an anterior portion of the implant and the hollow second actuator is disposed in an anterior portion of the implant. In some embodiments the second actuator is annularly and rotatably disposed around the first actuator. Further, in some embodiments, as disclosed below, the first actuator and the second actuator may not be coaxial. Rather, the first actuator and the second actuator may for example be parallel, and may be separated by a distance. All various placements of actuators known and used in the art of expandable interbodies are intended to be hereby contemplated and incorporated herewith.

Adjustment of expandable spinal implants may require an expansion driver. The expansion drivers described herein are capable of delivering one or more of simultaneous and equal amounts of torque to both a first actuator and a second actuator of an expandable implant that has two independent expansion mechanisms to allow for independent expansion of a first portion and a second portion of the implant.

According to an exemplary embodiment, the expansion driver has a drive source and two or more driver shafts. The input shaft and the two or more driver shafts are operably coupled by a differential for an expansion driver. A differential for an expansion driver may include at least one bevel gear, a first gear connected to a first output shaft, and a second gear connected to a second output shaft. The at least one bevel gear may be rotatably connected to a first drive source and configured to rotate around a first axis. The teeth of the at least one bevel gear may be simultaneously in communication with the teeth of the first gear and the second gear. Upon a rotation by the drive source of the at least one bevel gear, a torque may be transferred from the first drive source to the at least one bevel gear, and to one or more of the first gear and the second gear. If the first output shaft is experiencing a greater resistance from the first actuator of the implant as compared to a resistance simultaneously experienced by the second output shaft from a second actuator of the implant, the torque of the at least one bevel gear will be transferred to the second gear of the second output shaft. If the second output shaft is experiencing a greater resistance than the first output shaft, the torque of the at least one bevel gear will be transferred to the first gear of the first output shaft. If the resistance is substantially equal on the first output shaft and the second output shaft, the torque of the at least one bevel gear will be transferred to both the first gear of the first output shaft and the second gear of the second output shaft. This can be explained in that the torque effectively chooses the gear path of least resistance, and with all else being equal, drives both the first gear and the second gear.

As one with skill in the art may appreciate, a bevel gear may include a pinion and any type of known gear. Additionally, more gearing may be added to step up or step down the torque at one or more of the first drive shaft and the second drive shaft.

For example, one or more additional gears may be added between the first gear and the first output shaft to increase an amount of torque outputted at the first output shaft. Similarly, one or more additional gears may be added between the second gear and the second output shaft to increase an amount of torque outputted at the second output shaft. These gears may include planetary gear stages and similar stages known and used in the art to step up or step down torque.

Additionally, in some embodiments, the differential may include an epicyclic differential, a spur-gear differential, an active differential, a passive differential, and any other known differential.

In some embodiments, one or more pinion may be used to transfer torque from a coaxial first output shaft and second output shaft, to two parallel drivers. For example, the second output shaft may be annularly disposed around at least a portion of the first output shaft. The second output shaft may be connected to a first pinion. The first pinion may be configured to communicate a rotational motion to at least one transfer pinion, i.e., usually a first transfer pinion and a second transfer pinion. And the at least one transfer pinion may be in communication with a second pinion operably coupled to a second drive shaft. Depending on the size and number of transfer pinions used, this allows the first driver to be parallel to the second driver, despite the torque exiting the differential in a coaxial configuration.

Figure 3:
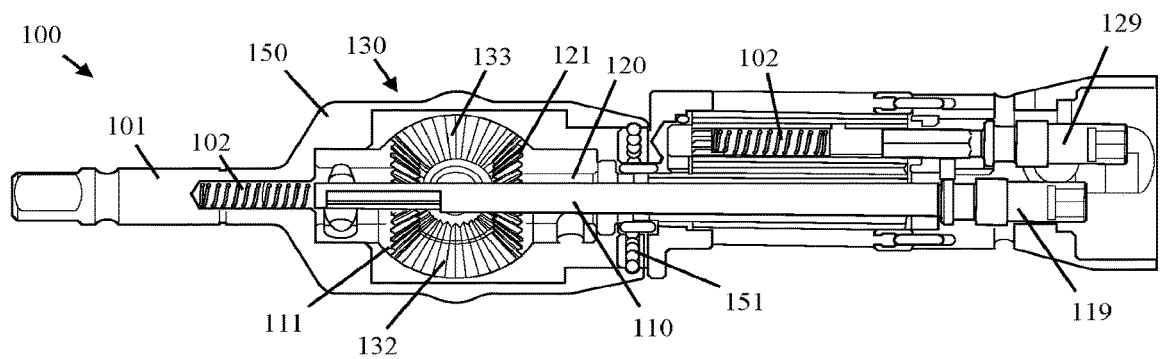
FIG. 3 shows a cross-sectional side view of the expansion driver in accordance with the first embodiment.

Turning to the drawings, FIG. 1 shows an expansion driver 100 for adjusting an expandable implant 900 (FIG. 11) including: an input shaft 101 operably connected to a differential 130 (FIG. 3). The expansion driver 100 includes a tab 153 configured to secure an expandable implant 900 to a tip of the expansion driver 100.

The internal components of the expansion driver 100 including differential 130 are shown in FIG. 3. The differential 130 includes at least one bevel gear 132, 133. The first bevel gear 132 and the second bevel gear 133 are each in communication with a first gear 111 connected to a first output shaft 110 and a second gear 121 connected to a second output shaft 120. At least a portion of the second output shaft 120 is annularly disposed around at least a portion of the first output shaft 110, and upon a rotation of the input shaft 101, a torque is configured to be applied to at least one of the first output shaft 110 and the second output shaft 120 by the differential 130.

The differential 130 in this embodiment includes a first bevel gear 132 and a second bevel gear 133, each rotatably disposed on an internal cavity of a housing 150 operably coupled to the input shaft 101. The first bevel gear 132 and the second bevel gear 133 are shown in communication with the first gear 111 connected to the first output shaft 110 and the second gear 121 connected to the second output shaft 120. Upon a rotation of the input shaft 101, the housing 150 is configured to rotate on a bearing 151 and rotate the at least one bevel gear 132, 133 around an axis of the first output shaft 110. In doing so, as will be discussed below, torque is transferred to one or more of the first output shaft 110 and the second output shaft 120 depending upon which is under the least amount of resistance at the first driver 119 and second driver 129.

A first end of the first output shaft 110 includes a first gear 111 and a second end of the first output shaft 110 includes a first driver 119. A first end of the second output shaft 120 includes a second gear 121 and a second end of the second output shaft 120 is in communication with a second driver 129. At least a portion of the second output shaft 120 is annularly disposed around at least a portion of the first output shaft 110. In this embodiment, the second driver 129 is offset from the first driver 119 and at least one pinion is included to transfer torque from the second output shaft 120 to the second driver 129 which is annularly disposed around the first output shaft 110, to the second driver 129 which extends substantially parallel to the first driver 119.

Figure 2:
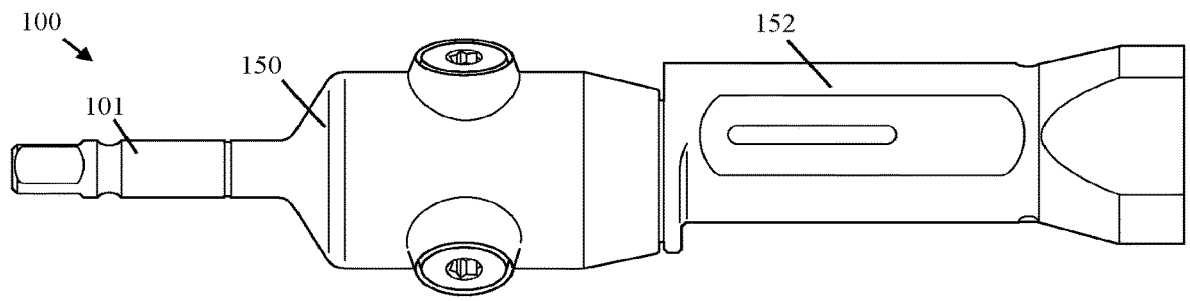
FIG. 2 shows a side view of the expansion driver in accordance with the first embodiment.
Figure 11:
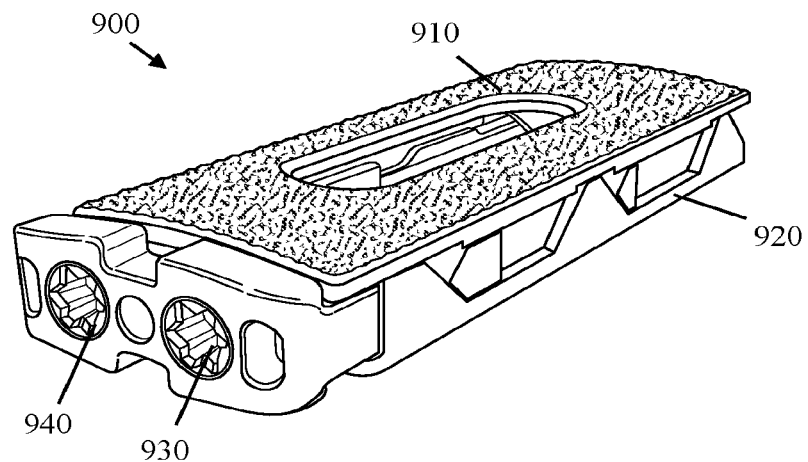
FIG. 11 shows a perspective view of an expandable implant in a first collapsed configuration.

In some embodiments, counter springs 102 are provided between the housing 150, 152 (FIG. 2) and the drivers 119, 129 (FIGS. 3-4) to keep the first driver 119 and the second driver engaged with the expandable implant 900 (FIG. 11).

Figure 4:
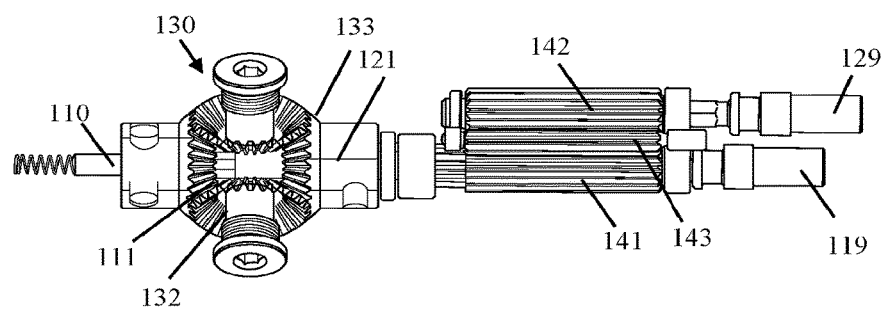
FIG. 4 shows some of the internal components of the expansion driver in accordance with the first embodiment.

FIG. 4 shows a first pinion 141 annularly disposed around at least a portion of the first output shaft 110. The teeth of the first pinion 141 are shown in communication with a first transfer pinion 143. The first transfer pinion 143 is simultaneously in communication with the second pinion 142, which is shown operably coupled to the second driver 129. The at least one pinion 141, 142, 143, 144 is configured to transfer torque from the second output 120 shaft to the second driver 129.

Figure 5:
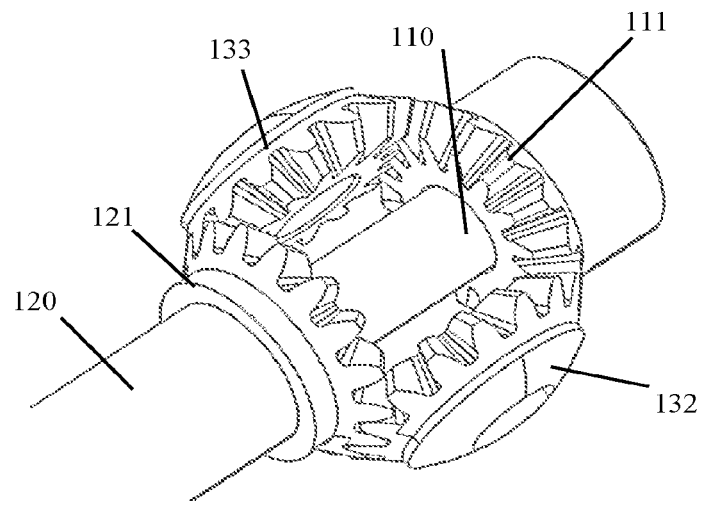
FIG. 5 shows a differential in accordance with a first embodiment including a first gear of a first driver, a second gear of a second driver, a first bevel gear and a second bevel gear.

FIG. 5 shows an enhanced view of a differential 130 in accordance with a first embodiment, including a first gear 111 of a first output shaft 110, a second gear 121 of a second output shaft 120, a first bevel gear 132, and a second bevel gear 133. The teeth of the first gear 111 are facing a direction substantially toward the teeth of the second gear 121, whereby both the first gear 111 and the second gear 121 can simultaneously communicate with each of the at least one bevel gears 132, 133. First bevel gear 132 and second bevel gear 133 are rotatably connected to a wall of a cavity connected to the input shaft 101, and are configured to rotate around an axis of the first output shaft 110 upon a rotation of the input shaft 101.

Figure 6:
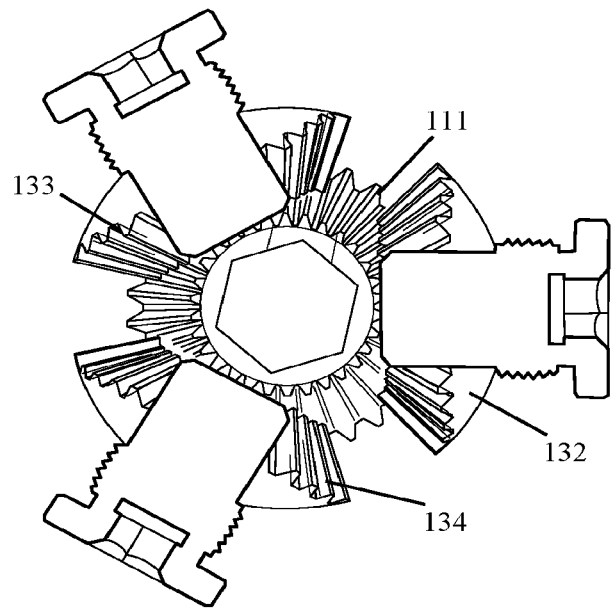
FIG. 6 shows a differential in accordance with a second embodiment including a first gear of a first driver, a second gear of a second driver, a first bevel gear, a second bevel gear, and a third bevel gear.

FIG. 6 shows an enhanced view of a differential 130 in accordance with a second embodiment including: a first gear 111 of a first output shaft 110, a second gear 121 of a second output shaft 120, a first bevel gear 132, a second bevel gear 133, and a third bevel gear 134. The teeth of the first gear 111 are again facing a direction substantially toward the teeth of the second gear 121, whereby both the first gear 111 and the second gear 121 can simultaneously communicate with each of the at least one bevel gears 132, 133, 134. Again, the first bevel gear 132, the second bevel gear 133, and the third bevel gear 134 are rotatably disposed within a cavity and operably connected to the input shaft 101, such that upon a rotation of the input shaft 101 the one or more bevel gears 132, 133, 134 are configured to rotate around an axis of the first output shaft 110.

As one with skill in the art may appreciate, a plurality of bevel gears may be added. As such, in some embodiments one, two, three, or more bevel gears may be included. Depending on the specific needs of a designer, a differential for an expansion driver may be formed by any number of bevel gears. As such only a limited number can be reasonably shown herein. Nonetheless, the use of any number of bevel gears is contemplated.

Additionally, all known and used gearing configurations for differentials are contemplated herein for use with expansion drivers.

Figure 7:
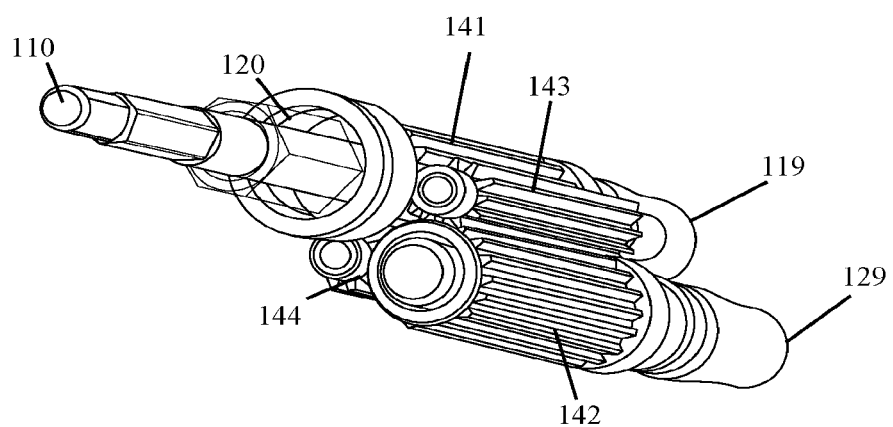
FIG. 7 shows a perspective view of a series of pinions connecting the second output shaft to the second driver.
Figure 8:
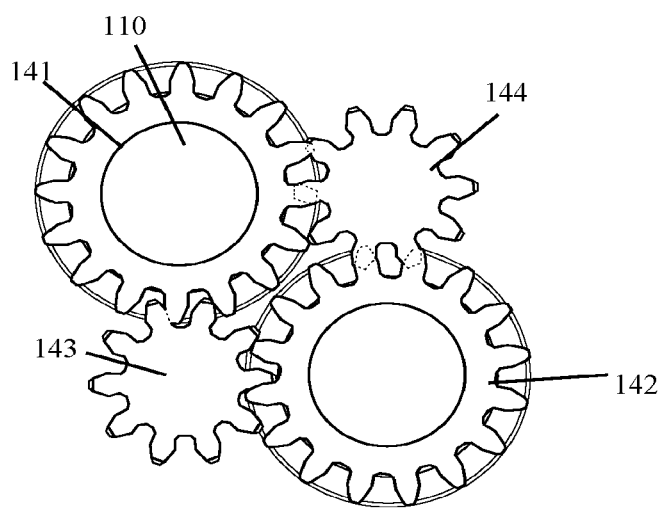
FIG. 8 shows a cross-sectional view of the series of pinions connecting the second output shaft to the second driver.

FIGS. 7 and 8 show perspective and cross sectional views of the at least one pinion 141, 142, 143, 144 configured to transfer torque from the second output shaft 120 to the second driver 129 which extends substantially parallel to the first driver 119.

FIG. 8 shows a first pinion 141 annularly disposed around at least a portion of the first output shaft 110. The teeth of the first pinion 141 are shown in communication with a first transfer pinion 143 and a second transfer pinion 144. The first transfer pinion 143 and the second transfer pinion 144 are simultaneously in communication with a second pinion 142, which is shown coupled to the second driver 129 (FIG. 7). Upon a rotation of the first pinion 141, a torque will be transferred to the first transfer pinion 143 and the second transfer pinion 144, which will in turn rotate the second pinion 142 and ultimately the second driver 129.

Figure 9:
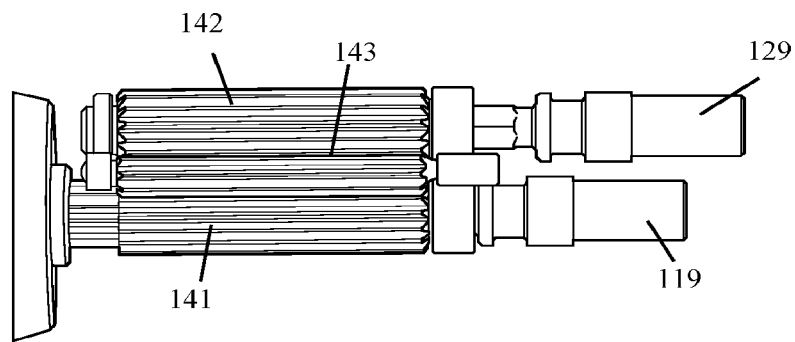
FIG. 9 shows an enhanced view of the tip of the expansion driver including the first driver and the second driver.
Figure 10:
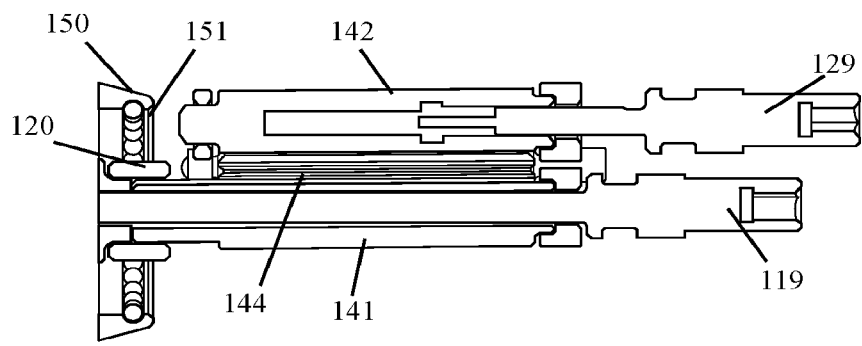
FIG. 10 shows a cross-sectional view of the tip of the expansion driver including the first driver and the second driver.

FIG. 9 shows the tip of the expansion driver 100 including a first driver 119 and a second driver 129. The first driver 119 is configured to communicate with a first actuator 930 of an expandable implant 900 (FIG. 11). The second driver 129 is configured to communicate with a second actuator 940 of an expandable implant 900.

FIG. 11 shows an expandable implant 900 in a first collapsed configuration. The expandable implant 900 includes: a first endplate 910, a second endplate 920, a first actuator 930 and a second actuator 940, wherein upon a rotation of one or more of the first actuator 930 and the second actuator 940, the first endplate 910 and the second endplate 920 are configured to move and to thereby change a dimension of the expandable implant 900.

As discussed above, the expansion driver 100 is configured to adjust the expandable implant 900 within the intervertebral disc space of a patient. In some embodiments, the expandable implant 900 may be removably secured to a tip of the expansion driver to place and adjust the expandable implant within the intervertebral disc space of a patient. The first driver 119 will be in communication with the first actuator 930 of the expandable implant 900, and configured to adjust the expandable implant 900 upon a rotation of the first driver 119. The second driver 129 will be in communication with the second actuator 940 of the expandable implant 900, and configured to adjust the expandable implant 900 upon a rotation of the second driver 129.

Figure 12:
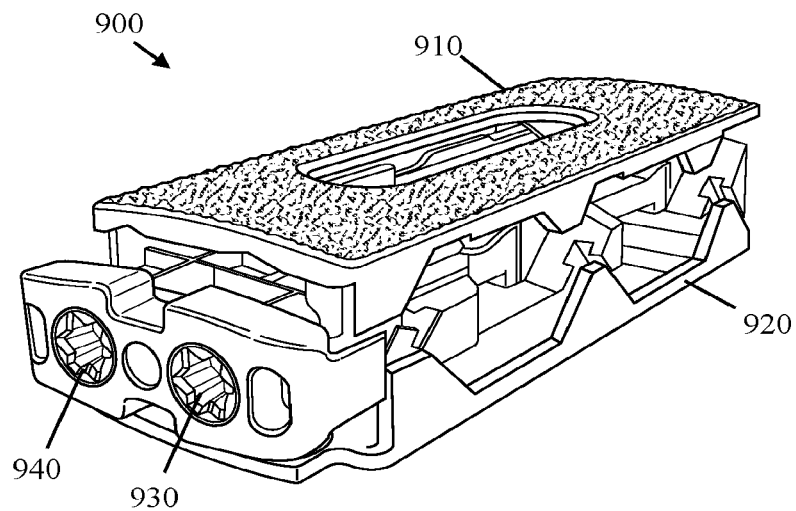
FIG. 12 shows a perspective view of the expandable implant in a second expanded configuration.

FIG. 12 shows a rear perspective view of the expandable implant 900 expanded into a second configuration. When the first actuator 930 and the second actuator 940 are rotated such that a first translating member and a second translating member move a substantially equal amount, this movement will expand the expandable implant 900, thereby changing the height of the expandable implant 900.

Figure 13:
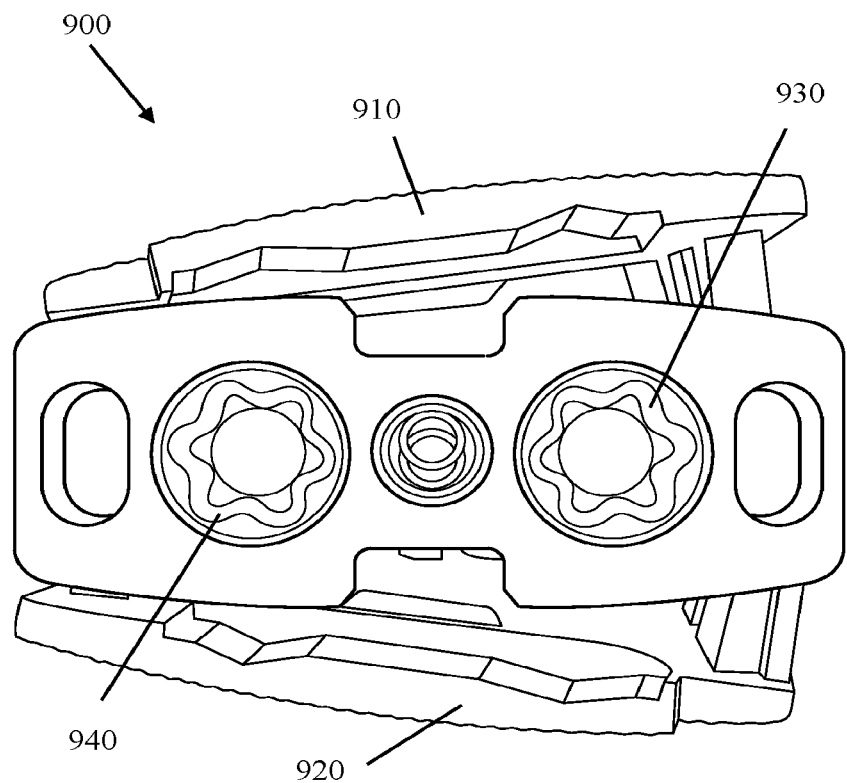
FIG. 13 shows a rear view of the expandable implant in a third expanded configuration.

FIG. 13 shows a rear perspective view of the expandable implant 900 expanded into a third configuration. When the first actuator 930 and the second actuator 940 are rotated such that a first translating member and a second translating member do not move a substantially equal amount, this movement will change an angle of lordosis of the expandable implant 900, thereby changing the height of the expandable implant 900.

Now, expandable implants 900 placed between vertebral bodies of a patient experience numerous forces, particularly during adjustment. As one with skill in the art may appreciate, in an expandable implant 900 having an actuator including a first actuator 930 and a second actuator 940, each actuator is going to experience a different amount of resistance upon adjustment which depends on an instantaneous load and state of the vertebral bodies relative to the expandable implant 900. When driving the first actuator 930 and the second actuator 940 using a fixed expansion driver, for example, unequal resistance can result in uneven and often undesired adjustment of the expandable implant 900. In the instant embodiment however, the differential 130 allows for selective driving by the expansion driver 100 to deliver a desired amount of torque.

For example, when a first amount of resistance from the first actuator 930 on the first driver 119 is less than a second amount of resistance from the second actuator 940 on the second driver 129, the first bevel gear 132 and the second bevel gear 133 of the differential 130 are configured to rotate the first driver 119 upon a rotation of the input shaft 101. The first driver 119 will in turn rotate the first actuator 930 to thereby adjust the expandable implant 900. The second driver 129 will not adjust the second actuator 940, and thus the first actuator 930 will continue to be rotated adjusting the angle of lordosis of the expandable implant 900 until a substantially equal amount of resistance is observed by the first actuator 930 and the second actuator 940.

When a first amount of resistance from the first actuator 930 on the first driver 119 is greater than a second amount of resistance of the second actuator 940 on the second driver 129, the first bevel gear 132 and the second bevel gear 133 are configured to rotate the second driver 129. The second driver 129 will in turn rotate the second actuator 940 to thereby adjust the expandable implant 900. The first driver 119 will not adjust the first actuator 930, and thus the second actuator 940 will continue to be rotated, adjusting the angle of lordosis of the expandable implant 900 until a substantially equal amount of resistance is observed by the first actuator 930 and the second actuator 940.

When a first amount of resistance from the first actuator 930 on the first driver 119 is substantially equal to a second amount of resistance of the second actuator 940 on the second driver 129, the first bevel gear 132 and the second bevel gear 133 are configured to rotate both the first driver 119 and the second driver 129. The first driver 110 will in turn rotate the first actuator 930, the second driver 120 will in turn rotate the second actuator 940, and both actuators will simultaneously adjust the expandable implant 900. As one with skill in the art may appreciate, in the instant embodiment of an expandable implant 900 simultaneous adjustment of the first actuator 930 and the second actuator 940 will result in a change in height of the expandable implant 900.

The expansion driver 100 is configured such that upon activation of a drive source which may include a rotation of a handle operably coupled to the input shaft 101, a torque is transferred from the input shaft 101 to the first bevel gear 132 and the second bevel gear 133, with the first bevel gear 132 and the second bevel gear 133 configured to rotate one or more of the first output shaft 110 and the second output shaft 120, depending on an amount of resistance experienced at the expandable implant 900. Further the first output shaft 110 terminates in the first driver 119, and the second output shaft extends annularly along at least a portion of the first output shaft 110 and is connected to a first pinion 141. The first pinion is in communication with at least one transfer pinion 143, 144 and the at least one transfer pinion 143, 144 is in communication with a second pinion 142, which is connected to a second driver 129. Therefore, rotation of the first output shaft 110 results in rotation of the first driver 119, and rotation of the second output shaft 120 results in rotation of the second driver 129.

Some or all of the foregoing components may be fabricated using known machining and additive manufacturing techniques. The drivers may be fabricated from known biocompatible materials including aluminum, steel, and titanium. Additionally, the handle may be fabricated from materials including: a polymeric material, carbon fiber, and metals.

According to one exemplary method of adjusting an expandable implant, the steps may include: preparing an intervertebral disc space of a patient; placing an expandable implant within the prepared intervertebral disc space of the patient; and adjusting the expandable implant using an expansion driver as described herein. In particular, the expansion driver used in the present method may comprise: an input shaft operably connected to at least one bevel gear, the at least one bevel gear configured to engage each of a first gear and a second gear; the first gear connected to a first output shaft, the first output shaft terminating in a first driver configured to communicate with a first actuator of an expandable implant; the second gear connected to a second output shaft, the second output shaft annularly disposed around at least a portion of the first output shaft; and at least one pinion configured to transfer a torque from the second output shaft to a second driver extending parallel to the first driver and configured to communicate with a second actuator of the expandable implant. The adjusting may further comprise rotating the input shaft, which in turn applies a torque to at least one of the first driver and the second driver.

To prepare the intervertebral disc space of the patient, the surgeon may first gain access to the intervertebral disc space via one or more of for example: an anterior, a lateral, a transforaminal and a posterior approach. The intervertebral disc may be partially or totally removed from the disc space. The contact surfaces of the adjacent vertebral bodies may be prepared to help promote fusion.

The expandable implant may be provided to the disc space by an insertion device, for example one or more of: an inserter and the expansion driver. First the expandable implant may be removably secured to the insertion device. Next the expandable implant may be placed within the prepared intervertebral disc space using, for example, a posterior, transforaminal or lateral approach. If an inserter is used, the inserter may be removed and an expansion driver may then be secured to the implant and used to adjust the expandable implant. If the expansion driver is used to insert the expandable implant, the next step is simply achieving a desired adjustment.

As described above, the expandable implant may be designed to be adjusted in one or more of a height, a length, a width and an angle of lordosis of the expandable implant. The expandable implant may be dimensioned according to the size of the patient. The handle of the expansion driver would be rotated, to adjust the expandable implant to the desired height, length, width, and angle of lordosis. Once the surgeon or user is satisfied with the amount of adjustment, the expansion driver may be removed from the expandable implant, and subsequently the patient, whilst leaving the expandable implant adjusted within the intervertebral space of the patient.

It may be desirable for the surgeon to pack one or more of the expandable implant and the intervertebral disc space using a bone graft or bone graft substitute material to promote fusion. Fixation plates may be applied to one or more of the vertebral bodies and the expandable implant to secure the expandable implant within the intervertebral disc space. Finally, all placement and expansion instrumentation may be removed and the access hole closed, to allow for the fusion and healing processes to begin.

Figure 14:
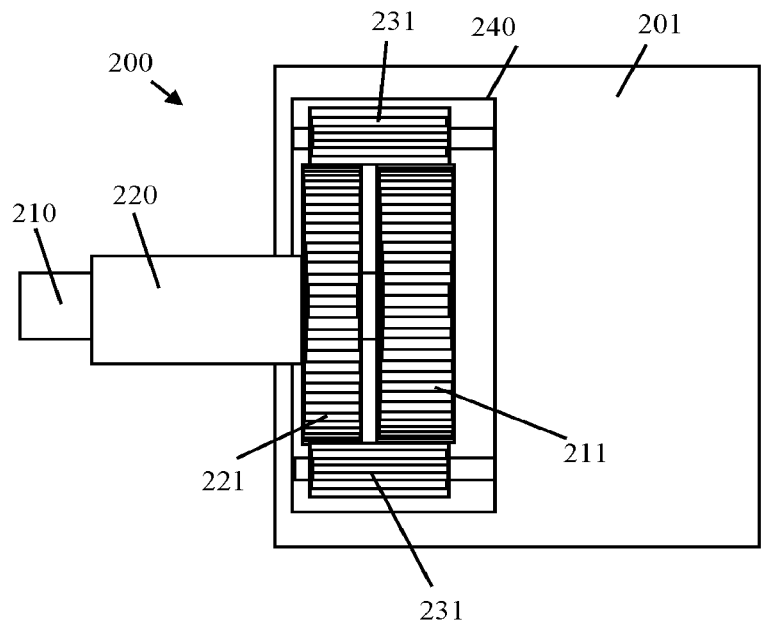
FIG. 14 shows a side view of an expansion driver having a differential in accordance with a third embodiment.

FIG. 14 shows a schematic of a differential 230 for an expansion driver 200 in accordance with a second embodiment according to the invention. Expansion driver 200 may include: a first gear 211 disposed at the first end of a first output shaft 210, a second gear 221 disposed at the first end of a second output shaft 220, and a rotating carrier 230 having one or more pinions 231. Upon a rotation of the rotating carrier 230, a torque is applied to one or more of the first output shaft 210 and the second shaft 220.

Figure 15:
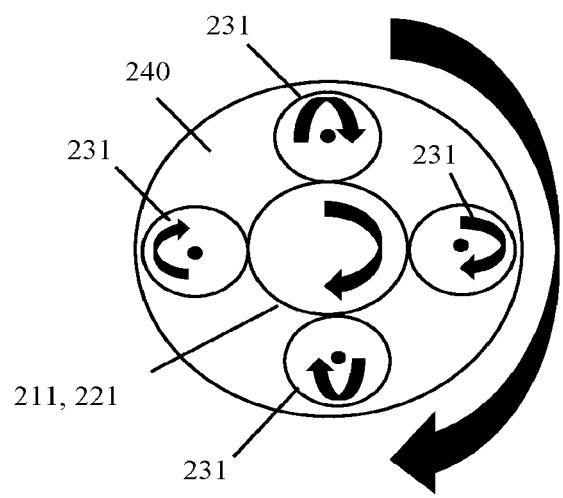
FIG. 15 shows a schematic top view of a rotating carrier of the expansion driver in accordance with the third embodiment of FIG. 14.

As previously described, the differential 230 includes a rotating carrier 230 having at least one pinion 231. In this embodiment there are four individual pinions 231, each configured to communicate with the first gear 211 and the second gear 221. Upon a rotation of the rotating carrier 230, which may be caused by rotation of the handle 201, as indicated in FIG. 15, the four pinions 231 are configured to rotate around the axis of the first output shaft 210, and thereby rotate at least one of the first gear 211 and the second gear 221, depending on which is experiencing less input resistance, as discussed above. It is contemplated that this design for a differential could be used in the aforementioned embodiments.

Exemplary embodiments herein have been directed to expandable implants configured for adjustment in height and angle of lordosis. It is contemplated that devices within the scope of this disclosure could be used to adjust expandable implants which are adjustable in height, length, width, angle of lordosis, and any change of dimension. The chosen embodiments should not be construed as limiting and this disclosure is intended to encompass the due bounds as presented in the claims.

What is claimed is:

1. A method for treating a spinal deformity, the method comprising the steps:
    preparing an intervertebral disc space of a patient;
    providing an expandable implant comprising a first actuator and a second actuator;
    placing the expandable implant within the prepared intervertebral disc space of the patient; and
    adjusting an angle and height of the expandable implant using an expansion driver, the expansion driver comprising:
    an input shaft operably connected to at least one bevel gear, the at least one bevel gear comprising a first bevel gear and a second bevel gear configured to engage each of a first gear and a second gear;
    the first gear connected to a first output shaft, the first output shaft terminating in a first driver configured to communicate with the first actuator of the expandable implant;
    the second gear connected to a second output shaft, the second output shaft annularly disposed around at least a portion of the first output shaft;
    at least one pinion configured to transfer a torque from the second output shaft to a second driver extending parallel to the first driver and configured to communicate with the second actuator of the expandable implant; and
    a housing operatively coupled to the input shaft;
    wherein upon a rotation of the input shaft a torque is applied to at least one of the first driver and the second driver.

2. The method of claim 1, wherein the adjusting further comprises, with the first bevel gear and the second bevel gear, rotating the first driver when a first amount of resistance on the first driver is less than a second amount of resistance on the second driver.

3. The method of claim 1, wherein the adjusting further comprises, with the first bevel gear and the second bevel gear, rotating the second driver when a first amount of resistance on the first driver is more than a second amount of resistance on the second driver.

4. The method of claim 1, wherein the adjusting further comprises, with the first bevel gear and the second bevel gear, rotating both of the first driver and the second driver when a first amount of resistance on the first driver is equal to a second amount of resistance on the second driver.

5. A method for treating a spinal deformity, the method comprising the steps:
providing an expandable implant comprising a first actuator and a second actuator;
placing the expandable implant within a prepared intervertebral disc space of a patient; and
providing an expansion driver for adjusting an angle and height of the expandable implant, comprising:
an input shaft operably connected to at least one bevel gear, the at least one bevel gear comprising a first bevel gear and a second bevel gear configured to engage each of a first gear and a second gear;
the first gear connected to a first output shaft, the output shaft terminating in a first driver configured to communicate with the first actuator of the expandable implant;
the second gear connected to a second output shaft, the second output shaft annularly disposed around at least a portion of the first output shaft;
at least one pinion configured to transfer a torque from the second output shaft to a second driver configured to communicate with the second actuator of the expandable implant; and
a housing operatively coupled to the input shaft, wherein the first output shaft and the second output shaft extend through the housing;
and
rotating the input shaft to rotate the first and second bevel gears so that a torque is applied to at least one of the first output shaft and the second output shaft.

6. The method of claim 5, wherein the second driver is offset from and extends in a direction substantially parallel to the first driver.

7. The method of claim 6, further comprising a handle configured to rotate the input shaft upon a rotation of the handle.

8. The method of claim 7, wherein the handle is configured to transfer a torque to the input shaft, and the input shaft is configured to rotate the first bevel gear and the second bevel gear.

9. The method of claim 7, wherein upon the rotation of the first bevel gear and the second bevel gear, the torque is applied to at least one of the first driver and the second driver.

10. The method claim 8, wherein when a first amount of resistance on the first driver is less than a second amount of resistance on the second driver, the first bevel gear and the second bevel gear are configured to rotate the first driver.

11. The method of claim 8, wherein when a first amount of resistance on the first driver is more than a second amount of resistance on the second driver, the first bevel gear and the second bevel gear are configured to rotate the second driver.

12. The method of claim 8, wherein when a first amount of resistance on the first driver is equal to a second amount of resistance on the second driver, the first bevel gear and the second bevel gear are configured to rotate both the first driver and the second driver.

13. A method for treating a spinal deformity, the method comprising the steps:
providing an expandable implant;
providing an expansion driver configured to adjust an angle and height of the expandable implant comprising:
an input shaft operably connected to a first bevel gear and a second bevel gear, the first bevel gear and the second bevel gear configured to engage each of a first gear and a second gear;
the first gear connected to a first output shaft, the first output shaft terminating in a first driver configured to communicate with a first actuator of the expandable implant;
the second gear connected to a second output shaft, the second output shaft annularly disposed around at least a portion of the first output shaft;
at least one pinion configured to transfer a torque from the second output shaft to a second driver extending parallel to the first driver and configured to communicate with a second actuator of the expandable implant; and
a housing operatively coupled to the input shaft, wherein the first output shaft and the second output shaft extend through the housing;
and
rotating the input shaft to rotate the first and second bevel gears so that a torque is applied to at least one of the first output shaft and the second output shaft.

14. The method of claim 13, further comprising a handle configured to rotate the input shaft upon a rotation of the handle.

15. The method of claim 14, wherein the handle is configured such that upon the rotation of the handle the torque is transferred from the handle to the input shaft, and the input shaft is configured to rotate the first bevel gear and the second bevel gear.

16. The method of claim 15, wherein upon the rotation of the first bevel gear and the second bevel gear, a torque is applied to at least one of the first driver and the second driver.

17. The method of claim 16, wherein when a first amount of resistance on the first driver is less than a second amount of resistance on the second driver, the first bevel gear and the second bevel gear are configured to rotate the first driver.

* * * * *